United States Patent [19]

Marum

[11] Patent Number: 5,930,312
[45] Date of Patent: Jul. 27, 1999

[54] APPARATUS AND METHOD FOR SELECTING DIFFERENT COMMUNICATION SPEEDS ON A DATA SIGNAL LINE

[75] Inventor: John R. Marum, Oakland, Calif.

[73] Assignee: Tut Systems, Inc., Pleasant Hill, Calif.

[21] Appl. No.: 08/845,560

[22] Filed: Apr. 24, 1997

[51] Int. Cl.$^6$ ............................................. H04L 23/00
[52] U.S. Cl. .......................................................... 375/377
[58] Field of Search ................................. 375/259, 377, 375/222

[56] References Cited

U.S. PATENT DOCUMENTS

| | | | |
|---|---|---|---|
| 4,236,248 | 11/1980 | Teramura et al. | 375/53 |
| 4,270,205 | 5/1981 | DeShon | 371/32 |
| 4,680,781 | 7/1987 | Amundson et al. | 375/8 |
| 4,717,896 | 1/1988 | Graham | 333/25 |
| 4,780,883 | 10/1988 | O'Conner et al. | 375/222 |
| 4,800,344 | 1/1989 | Graham | 333/25 |
| 5,524,122 | 6/1996 | Lepitre et al. | 375/222 |

*Primary Examiner*—Temesghen Ghebretinsae
*Attorney, Agent, or Firm*—Blakely, Sokoloff, Taylor & Zafman, LLP

[57] ABSTRACT

An apparatus and method for automatically selecting different data rates for communicating data over a high bit rate, digital signal line (HDSL) line such as a dry pair line. In one embodiment master/slave interface circuits at opposite ends of a line attempt to establish communications at a higher frequency. If this fails, communications are attempted at a lower frequency. If communications are successful at the higher frequency and communications continue for a predetermined period of time at the higher frequency and then communications fail, an attempt is made to reestablish communications at the higher frequency. An algorithm is set forth for enabling selecting among a plurality of different speeds.

8 Claims, 6 Drawing Sheets

APPARATUS AND METHOD FOR SELECTING DIFFERENT COMMUNICATION SPEEDS ON A DATA SIGNAL LINE

BACKGROUND OF THE INVENTION

1. Field of the Invention

The invention relates to the field of communicating digital data signals over lines such as twisted pair lines.

2. Prior Art

There is an enormous installed base in the United States and elsewhere of twisted pair lines and similar lines. For the most part, these lines were installed to carry voice communications confined to lower frequencies. The recent need for additional bandwidth, for example to connect home and businesses to the Internet, has presented both opportunity and challenges to better utilize this installed base for higher speed communications.

Integrated circuits are available which provide duplex communications with echo canceling capability and adaptive equalization. These circuits are designed to operate at a selected speed which is selected based on criteria such as the length of a line and the gauge of wire in the line. For instance, for a twisted pair line of 19.0 k feet with #24AWG wire, a data rate of 528 kbps may be selected. On the other hand, if a distance is increased for the same wire to 20 k feet, the data rate may be reduced to 400 kbps.

Selection of data rates based on line length and other physical characteristics does not necessarily optimize the bandwidth of the line since there are numerous other variables which affect the frequency response of the line such as the condition of the line, its environment, interference, etc.

As will be seen, the present invention adds another layer of adaptation to more fully realize the bandwidth capabilities on a digital data line particularly a dedicated line.

SUMMARY OF THE INVENTION

An apparatus and method for communicating over a data signal line is described. In one embodiment, the apparatus includes an interface circuit having an analog circuit and a digital signal processor (DSP) which are coupled to received and transmit data onto the line. The apparatus includes a controller coupled to the interface circuit. The (controller provides timing signals at, at least, two different frequencies selected under the control of a first control signal. An oscillator in the controller receives a second control signal from the interface circuit used by the oscillator in a receive phase for controlling the timing signals. The controller includes a state machine having states corresponding to the two different frequencies of the timing signals. This state machine provides the first control signal.

In one method of the present invention, initiating of communications is attempted at a first data rate or speed corresponding to a first frequency. If communications are not successful at the first speed, reactivation is attempted at a second speed corresponding to the second frequency, lower than the first speed. On the other hand, if communications are successful at the first speed, then communications are continued at the first speed. If communications are successful for a predetermined period at the first speed and the line then appears to be bad, there is an attempt to reactivate at the first speed rather than reactivating at the second lower speed. If this reactivation at the first speed is unsuccessful then reactivation at the lower speed is attempted.

DETAILED DESCRIPTION OF THE PRESENT INVENTION

A method and apparatus for communicating data over a high bit rate, digital subscriber line (HDSL) is described. In the following description numerous specific details are set forth, such as specific data rates and components. It will be apparent to one skilled in the art that the present invention may be practiced without these details. In other instances, well-known circuits and other design details are not set forth in order not to obscure the present invention.

In the present invention timing signals from oscillators are used to control the communications of data over the digital subscriber line (DSL). The frequency of a signal from an oscillator is, for the embodiments illustrated below, higher than the rate (speed) at which data is transmitted or received. For clarity below, "frequency" is used to refer to the oscillator output whereas "speed" or "rate" are used to refer to the data transfer rate. For the embodiments below, the oscillator frequencies are 16 or 32 times higher than the corresponding data speed.

Figure 1:
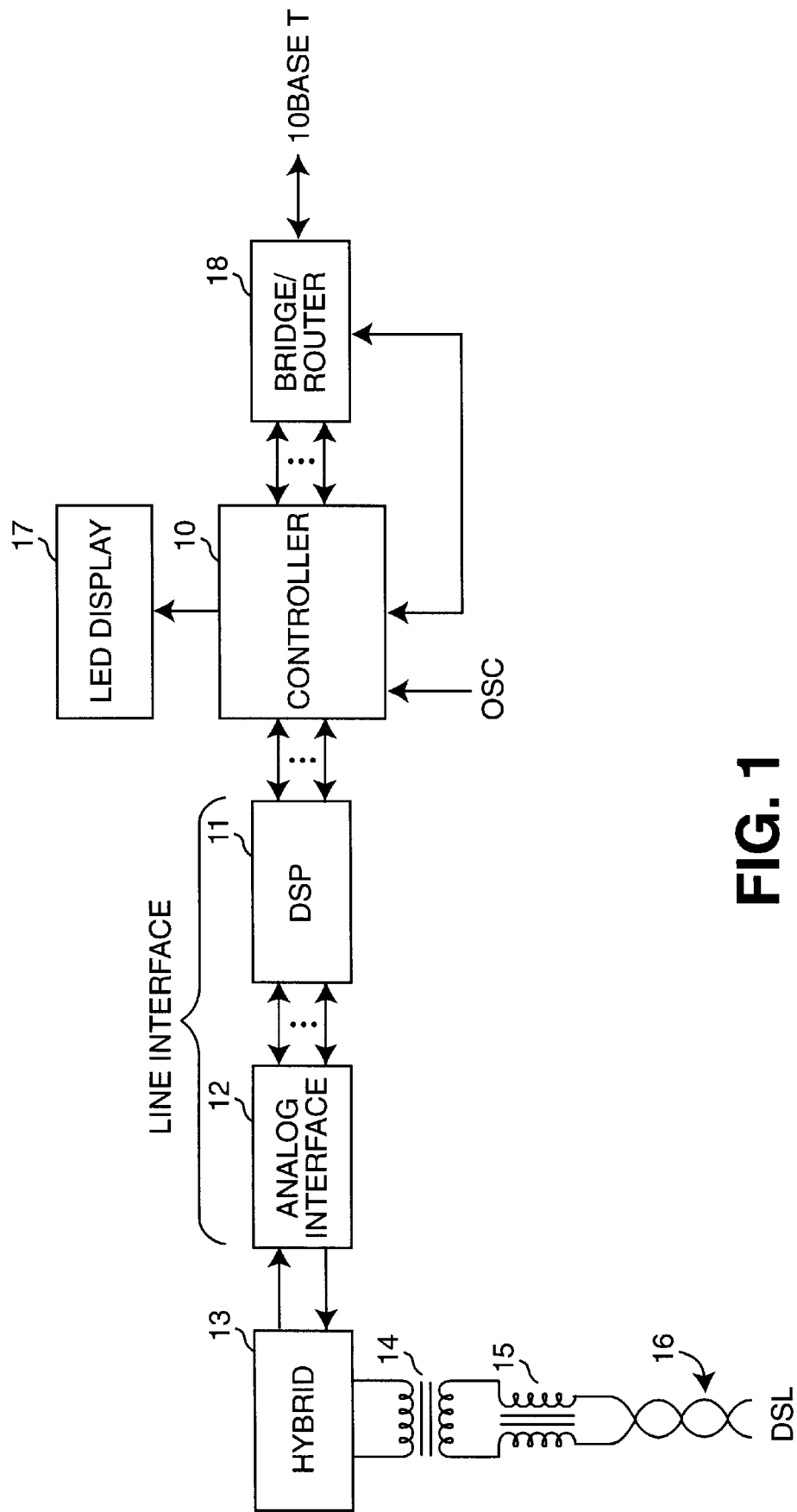
FIG. 1 is a block diagram illustrating the apparatus of the present invention.

Apparatus of FIG. 1

Referring now to FIG. 1, an apparatus (sometimes below referred to as a "unit") in accordance with the present invention is illustrated connected to a DSL 16. The line 16 may be a dedicated twisted pair, HDSL interconnecting a home, business, or the like with a central office, Internet service provider (ISP) or the like. Such lines are dedicated to digital data (no voice) and consequently, the entire bandwidth of the line may be used for digital communications. These lines are sometimes referred to as "dry pairs". The unit of FIG. 1 is typically used at each end of the line, that is one at a home or business and one at the central office or ISP. One such unit is designated as the master; for the embodiment described below the master is located at the home or business. The other unit is designated as the slave and for the embodiment discussed below, this unit is located at the central office or ISP. At one end of the line such as at the home or business, the unit of FIG. 1 may interconnect with a local area network such as a 10Base-T network. At the other end of the line the apparatus may be coupled to a wide area network or local area network.

The DSL 16 is coupled through a balun 15 and transformer 14 to a hybrid network 13. The network 13 is an ordinary network that converts the duplex communications on the line 16 into receive and transmit signals on separate lines. The balun 15 and transformer 14 may be ordinary well-known components. For instance, baluns are described in U.S. Pat. Nos. 4,717,896 and 4,800,344.

The hybrid network 13 communicates with line interface circuitry which in one embodiment comprises an analog interface, integrated circuit 12 and a digital signal processor (DSP) 11, also an integrated circuit. These integrated circuits, by way of example, may comprise the MDSL Data Pump Chip Set manufactured by Level One (part numbers SK70720/SK70721).

Figure 2:
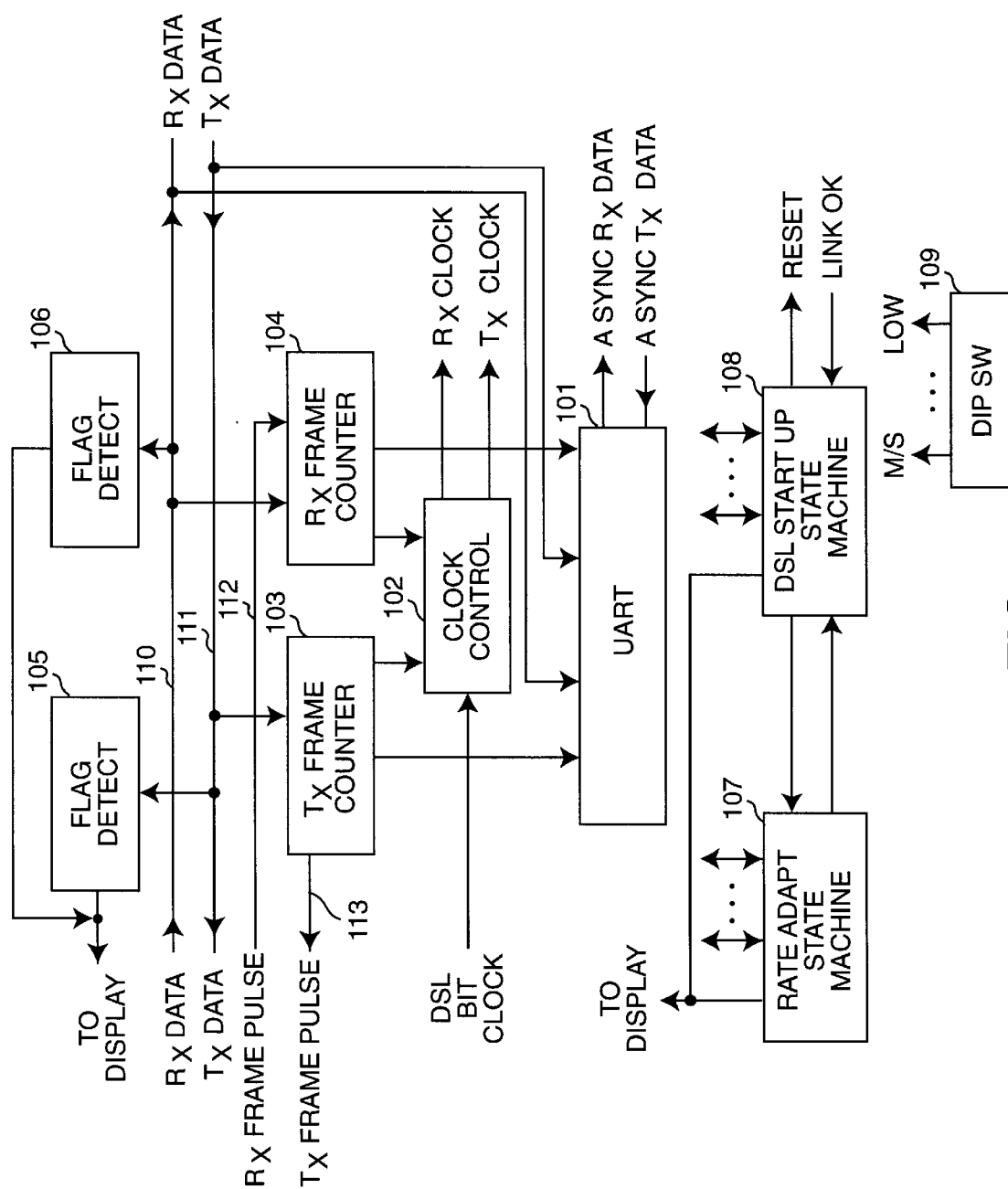
FIG. 2 is a block diagram illustrating one embodiment of the controller of the present invention.

The analog interface circuit 12 includes transmitter line drivers, filters, encoders, automatic gain control circuitry, analog-to-digital conversion and, as will be seen in conjunction with FIG. 2, provides a voltage controlled oscillator output used in a receive mode. (In some cases the hybrid network may be incorporated into the interface circuitry.) Such analog circuits are commonly used on HDSLs.

The DSP includes the processing required for the digital-to-analog conversion, echo-canceling, and adaptive equalization. An activation state machine in the DSP operates in conjunction with a state machine of the controller of FIG. 2 as will be discussed in conjunction with FIG. 5. The DSP circuit implements a training mode allowing, for instance, coefficients to be established in the DSPs of the master and slave units. The DSP provides numerous signals to its respective controller 10 including signals indicating when a data signal is valid. These signals, by way of example, are used by the state machines to indicate "link bad" or that data is being successfully communicated over the DSL. Other signals communicated between the controller and DSP are shown in FIG. 2.

The bridge/router 18 may be a commercially available unit such as a Sourcecom G3 router. The output of the controller is connected to the WAN terminal of this router. The bridge/router of FIG. 1 is shown providing a 10Base-T signal. The unit of FIG. 1 as will be discussed includes an embedded asynchronous channel.

Controller of FIG. 2

In FIG. 2 the controller 10 of FIG. 1 is shown in block diagram form. In one embodiment the controller is realized as a gate array (specifically a Xilinx FPGA).

The controller implements the logic needed to create transmit frame pulses and separate the incoming/outgoing data streams into overhead bits, cyclic redundancy checking (CRC) and the embedded asynchronous communications channel.

The incoming data on line 110 is framed by the remote end's transmit framing pulses received on line 112 from the DSFP 11 and which is coupled to the receive frame counter 104. This framing is automatically detected by the DSP 11 and coupled to the controller in the form of the receive frame pulse (RFP) and a receive frame and stuff indicator (RFST). The RFP indicates the last bit in the frame which for one embodiment is bit 4702 since the stuff bits are not injected. The RFSP input is used to trigger a RS flip-flop (not shown) which turns on and off the receive clock through the clock control 102.

The clock control receives a bit clock signal from the DSP 11. (The clocking will be discussed in more detail in conjunction with FIG. 3). This control over the RX clock at the output of the clock control 102 prevents the bridge/router 18 of FIG. 1 of being clocked when the framing bits are being sent. Additionally, two other inputs to the clock control 102 from another section of the controller 10 (not shown) allow stopping and starting of the receive clock within the clock control 102 when the data bits are being used for the embedded asynchronous mode. The incoming data of the clock signal are passed through a data detector which look for data patterns other than flags from the interface circuit having the pattern (01111110). A non-flag pattern, through the flag detector 106, will trigger a receive LED on the display for 6 or 12 milliseconds depending on whether the data rate is either 768 kbps or 348 kbps.

The outgoing (TX) data on line 111 also requires a frame pulse supplied by the controller. The 16 bit counter 103 counts off the data since the last reset and supplies an output frame pulse on line 113 for every 4702 bits. This counter is also used to mark the end of 14 framing bits, the end of a CRC sequence and every 32nd and 64th bit of the frame which are used for the embedded asynchronous channel. The clock control 102 is stopped by a framing pulse from the counter 103, and restarts the TX clock after the framing bits and the CRC bits have passed. Flag detector 105 monitors the data for non-flag bytes and lights a transmit LED for 6 or 12 milliseconds depending on the data rate.

The universal asynchronous receiver/transmitter (UART) 101 supplies/receives the control signal for the embedded asynchronous mode. The UART 101 extracts every 32nd or 64th bit of the incoming data stream (depending on line speed) and searches for 0s. An 8-bit counter is used to extract the appropriate bits and pass back a start and stop receive clock pulse to the clock control 102. This prevents the bridge/router 18 from clocking in bits dedicated to the asynchronous channel. An 8-bit shift register shifts in these asynchronous bits until the ninth bit becomes a 0. This corresponds to the start bit in the asynchronous stream. With the ninth bit 0, the lower 8 bits of data are latched into a another shift register and the first register presets to all 1s. The second level shift register shifts out the byte at for instance, 2400 baud using a baud rate generator based on a 384 kHz bit clock from the interface circuit.

The UART 101 captures asynchronous data from the bridge/router 18 at for instance, the rate of 2400 baud and injects it into the DSL data stream at every 32nd and 64th bit, depending on the line speed. An edge detector looks for a high to low transition on the incoming asynchronous data. A falling edge resets a counter to time the incoming bit cells. This counter continues to run and resets itself after 1-bit cell time or whenever it detects another falling edge. When the first bit (start bit) reaches the ninth bit of the shift register, the 8 data bits are latched into another shift register and the first register is preset with 1s. The second shift register is clocked on the reserved bits in the DSL data stream so that a start bit is sent followed by 8 data bits.

Figure 4:
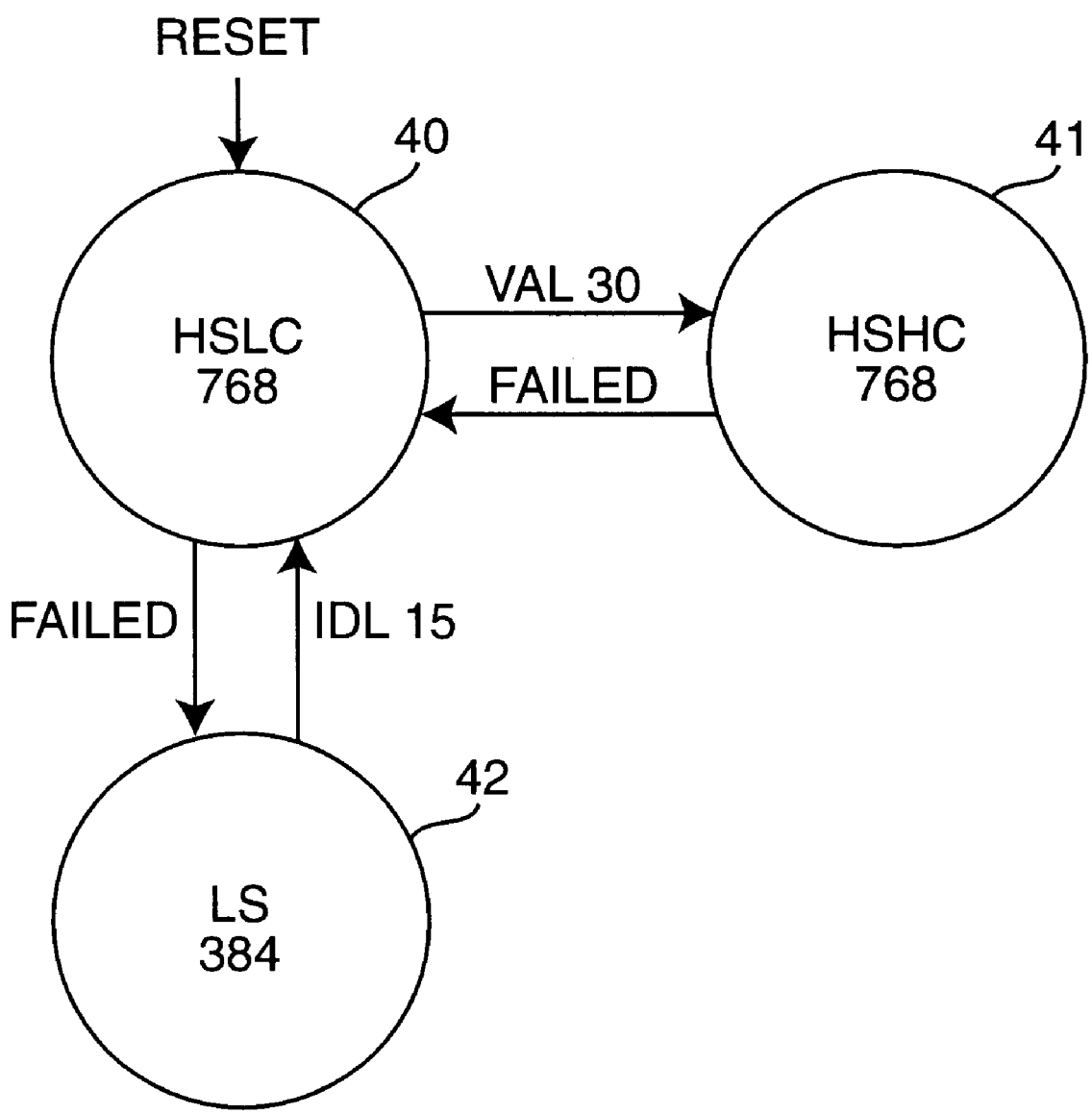
FIG. 4 is a state diagram associated with the first state machine of the controller of FIG. 2, illustrating the states used to implement one method of the present invention.

State Machine of FIG. 4

The controller 10 of FIG. 1 contains the state machine 107. The state machine controls the clock dividers shown in FIG. 3 which will be discussed later. In one embodiment the state machine changes the clocking signal to the interface circuit to support data speeds of 768 kbps or 348 kbps by implementing the state diagram of FIG. 4. The frequencies corresponding to these data rates are coupled to the terminals of the interface circuit which normally receive a single frequency input.

Upon reset, state 40 of FIG. 4 is entered, this state is referred to as the high-speed low-confidence (HSLC) state. In this state reactivation begins at the higher speed of 768 kbps. As will be discussed later in conjunction with the FIG. 5, activation is attempted including training to initiate communications at this higher data rate.

With the embodiment under discussion, if communication remains valid at the higher data speed for 30 seconds (link is good, then there is a transition from state 40 to state 41. This is indicated by "VAL 30". State 41 is the high-speed high-confidence (HSHC) state. In this state communications continues at the high speed of 768 kbps. If the link becomes bad (transmissions fail) there is a transition to state 40 and in state 40 there is an attempt to reestablish communications at the higher rate of 768 kbps. On initial reset or on return to state 40 from state 41 if successful communications cannot be obtained in state 40, there is a transition from state 40 to state 42. In state 42 communications are attempted at a lower speed, specifically 384 kbps. Presumably, if transmissions fail at the high speed they will be successful at the lower speed. Successful communications continue to be attempted in state 42. If there are no communications for a period of 15 seconds, in one embodiment, there is a return to state 40. On reset, communications are then attempted at the higher frequency.

With the algorithm implemented by the state machine of FIG. 4, once successful communications are achieved at the higher speed for a predetermined period of time and are then lost, there is an attempt to reestablish communications at the higher speed. On the other hand, if communications initially fail at the higher speed or cannot be reestablished at the higher speed after the return from the high-confidence high speed state, then communications are attempted at the low speed.

In some cases a temporary condition may prevent communication at the higher speed. Assuming that communication is established at the lower rate, the state machine may cause these communications to continue indefinitely at the lower speed if there is no idle time. In another embodiment, a transition occurs from the lower speed (state of 42) to state 40 periodically to determine if communications are again possible at the higher speed. This period may, for instance, be one hour.

Figure 6:
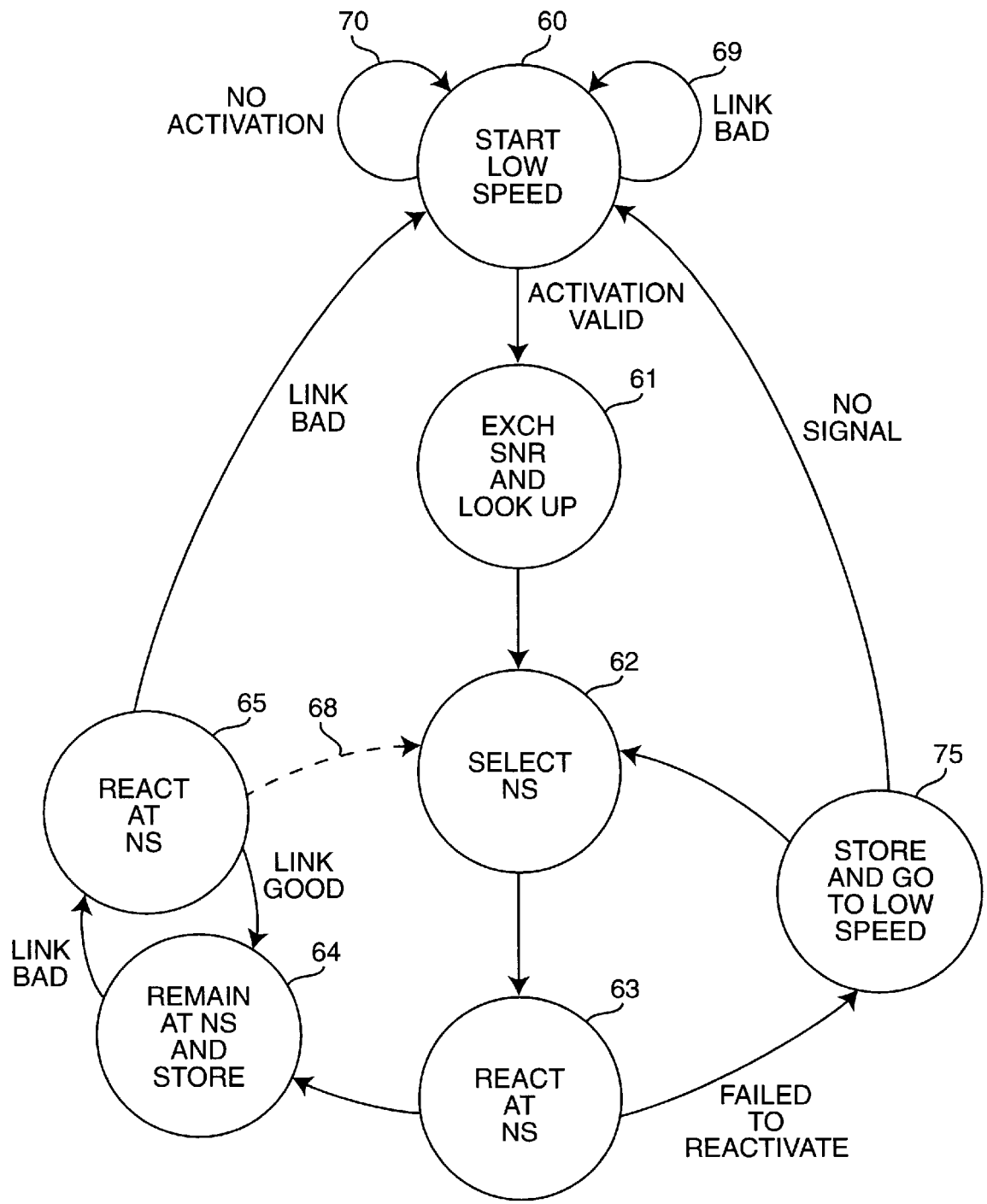
FIG. 6 is a state diagram illustrating another method of the present invention which may be implemented by the first state machine of FIG. 2.

State Diagram of FIG. 6

FIG. 6 shows another state machine that may be implemented as the rate adaptation state machine 107 of FIG. 2. This state machine provides for more than two data speeds and may be used where switching occurs between two or more frequencies.

Communications are first attempted (state 60) at the lowest speed. If the link is bad as indicated by path 69 or no activation occurs, as indicated by path 70, the state machine remains in state 60. Upon activation, there is a transition to state 61 where data is exchanged or is transmitted from one interface unit at one end of the line, to the other interface circuit at the other end of the line. For instance, the signal-to-noise ratio is measured by both units and the measurement at the slave unit is transmitted to the master unit. At the master unit the lower of the ratios (worse case transmission characteristics) is used to select from a look-up table, the highest speed which is likely to provide successful communications at that signal-to-noise ratio. This is indicated by state 62 as select new speed (NS).

Next as indicated by state 63 reactivation is attempted at the new speed. If activation is unsuccessful at the new speed, there is a transition to state 75. In state 75 the speed attempted at state 63 is recorded and if there is still a signal being received there is a transition to state 62 where a new speed is selected which is lower than the speed previously recorded in state 75. There is then an attempt to reactivate at the second new speed in state 63.

At any time that reactivation is successful in state 63 there is a transition to state 64 and communication continues in this state. Again the speed is recorded. If communications become unsuccessful as indicated by "link bad" there is a transition to state 65 and reactivation is attempted at the speed previously recorded in state 64. If communications are successful there is a transition to state 64. If communications are unsuccessful, there may be a transition to state 62 as indicated by the dotted line 68. In state 62 a new speed is selected, lower than the speed previously used and reactivation is again attempted in state 63.

As mentioned, in connection with the state diagrarr of FIG. 4, a temporary anomaly on the line may force communications, at a low speed and then communication may continue at this low speed for an extended period of time. To prevent this from happening, periodically (e.g., once per hour) there may be a transition from state 65 to state 61 as indicated by the line 67, allowing for the signal-to-noise ratios to again be determined and a new frequency selected. Thus, if a temporary anomaly is cleared presumably a higher speed will be selected.

Figure 5:
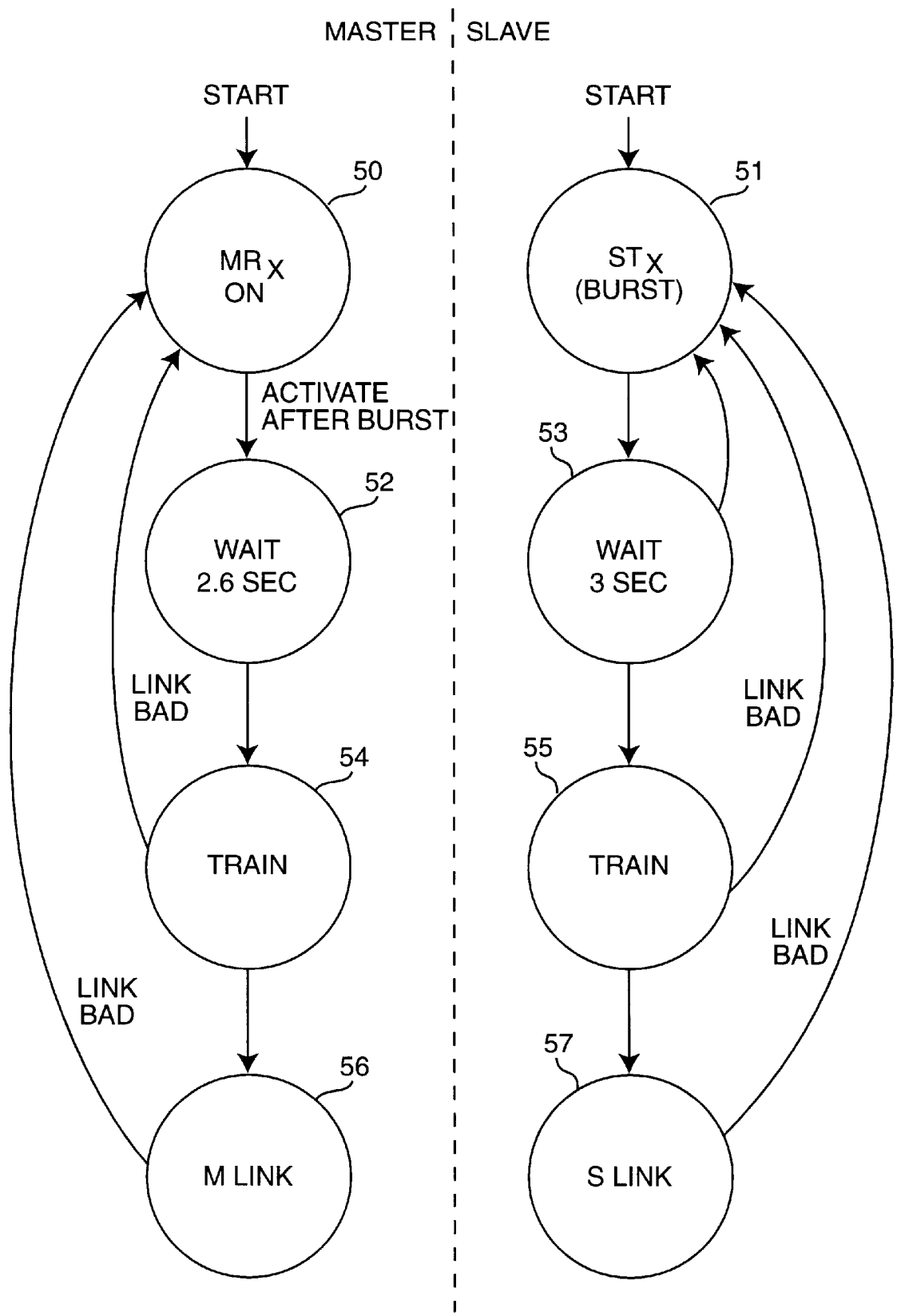
FIG. 5 is a state diagram associated with a second state machine of the controller of FIG. 2, used on start-up or on reactivation at a different data speed.

State Diagram of FIG. 5

The states of the start-up state machine 108 of FIG. 2 are shown in FIG. 5. One of two state diagrams are implemented depending on whether the controller is a master unit or slave unit; both state diagrams are shown in FIG. 5. The selection of master or slave in one embodiment is made by manually selectable switches 109 which provide inputs to the controller to select a slave mode or master mode. Another input which is used and which may be manually or electrically selectable is shown as "low" in FIG. 2 which forces the controller to operate at for instance, its lowest speed. This may be used where it is desirable to have the best possible link for error-free transmission, for example when billing data is transmitted over the link.

The master/slave state machine of FIG. 5 operates in conjunction with a state machine in the DSP 11 of FIG. 1. The latter state machine controls, for instance, the training used to establish the coefficients and other parameters needed upon activation.

Referring now to FIG. 5, the slave state machine begins in state 51 where bursts of signals are periodically transmitted onto the line. In one embodiment, these bursts are 384 milliseconds in length and are repeated every 3 seconds. In practice, these bursts are sent from a central office or ISP. When the unit at the other end of the line (home, business, etc.) wishes to communicate it enters state 50. After receiving the burst there is a transition from state 50 to state 52. This transition triggers the DSP in the master unit to begin activation. In one embodiment, because of the specific DSP used, there is a 2.6 second wait in state 52. After this wait the master DSP provides signals to the slave DSP causing both to enter a training state. After the 2.6 second wait of state 52, the master enters the training state 54. In the slave unit, after each burst, state 53 is entered. In state 53 there is a 3 second wait, and if no signals are received in that 3 seconds, there is a return to state 51 where another burst is transmitted. On the other hand, if a slave unit receives signals from the master unit after the 2.6 second wait of state 52, it enters the training state 55.

In the training states, there is an examination of received data, transmission in two levels, then four level line codes occur, searching for framing bits occur, etc. If successful communication is achieved between the interface circuits, a signal is sent to the controller in the master and slave units and there is a transition in the master unit from state 54 to state 56. Similarly, there is a transition in the slave unit from state 55 to state 57. In states 56 and 57 data transfer occurs.

If communication is unsuccessful before reaching states 56 and 57, there is a return from state 54 to state 50 in the master unit and from state 55 to state 51 in the slave unit. At any time during the communication of data, when the link is broken or when data ceases to be transmitted, there is a return to state 50 from state 56 in the master unit, and a return to state 51 from state 57 in the slave unit.

The start-up state diagram of FIG. 5 sequences each time there is a change in data speeds. Thus, referring back to the states diagram of FIG. 4, the various states of FIG. 5 occur each time there is a transition from state 40 to state 42, or from state 41 to state 40.

Generation of Clock Signals

Figure 3:
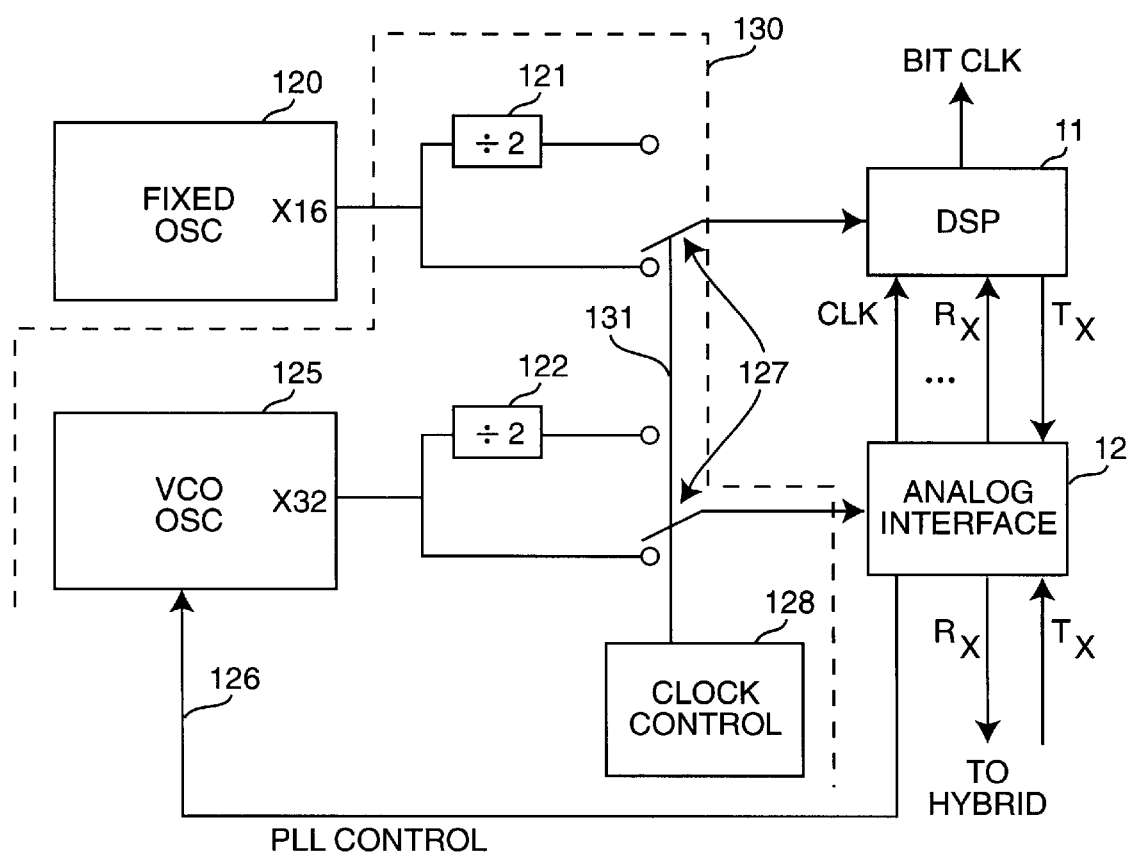
FIG. 3 is a block diagram of oscillators and their connection as used in one embodiment of the present invention.

For the embodiment illustrated in FIG. 1, particularly where the Level One Chipset are used for the interface circuit, two oscillators are used. Referring to FIG. 3, one oscillator is a fixed oscillator 120 mounted on the printed circuit board which includes the other components shown in FIG. 1 and the second a VCO controlled oscillator 125 which is part of the controller 10. The fixed oscillator 120 which is a crystal controlled oscillator, provides an output frequency 16 times higher than the highest data rate required or 16×768 kHz for the embodiment described above. The oscillator 125 has a nominal frequency 32 times higher than 768 kHz. The output of the fixed oscillator 120 is coupled to a ÷2 circuit 121. Similarly, the output of the oscillator 125 is coupled to a ÷2 circuit 122. These ÷2 circuits, the clock control 128 and as mentioned the oscillator 125 are part of the controller 10 of FIG. 1 as indicated by the dotted line 130. An electronically implemented double pole, double throw switch 127 in the controller is controlled by the clock control 128 (as indicated by line 131). This allows either the fixed frequency from oscillator 120 or one-half this frequency to be coupled to the DSP 11. Similarly, the output of the oscillator 125 or one-half this output frequency, is connected to the analog interface circuit 12. The clock control 128 selects between the oscillators outputs or one-half the output frequency. The clock control 128 receives signals from the state machine of FIG. 4 which determine whether communications will occur at 384 kbps or 768 kbps.

The DSP 11 provides the bit clock to the controller as shown in FIGS. 2 and 3 and additionally other timing signals are provided including timing signals to the bridge/router 18. With the Level One Chipset, when the analog interface 12 of FIG. 3 is receiving a signal from the other end of the line, this circuit provides a phase lock loop control signal on line 126 to the oscillator 125.

While in FIG. 3 only ÷2 circuits are shown, the controller can be implemented with additional circuits (e.g., ÷3, 4, 5) to provide a plurality of different output frequencies under control of a switch to implement the multiple frequencies as discussed in conjunction with FIG. 6.

Thus, an apparatus and method for selecting different data rates for communicating data over a line has been described.

I claim:

1. An apparatus for communicating digital data over a line comprising:

an interface circuit including an analog circuit and a digital signal processor (DSP) coupled to receive digital data from and transmit digital datal onto the line;

a control circuit coupled to the interface circuit, the control circuit comprising:

an oscillator for providing to the interface circuit timing signals selectively at, at least, two different frequencies under control of a first control signal, the oscillator being coupled to the interface circuit to receive a second control signal from the interface circuit used by the oscillator in at least one phase of operation for controlling the timing signal; and a first state machine coupled to the oscillator, having states corresponding to the two different frequencies of the oscillator, the state machine providing the first control signal.

2. The apparatus defined by claim 1 wherein the control circuit includes a second state machine for causing reactivation of the interface circuit at the two different frequencies.

3. The apparatus defined by claim 2 including a selectable input to the control circuit for selecting between a slave mode and a master mode.

4. The apparatus defined by claim 3 wherein the one phase is a receive mode.

5. The apparatus defined by claim 3 wherein the selectable input includes an additional input to select one of the two frequencies.

6. An apparatus for communicating data over a line comprising:

a hybrid circuit coupled to the line;

an interface circuit including an analog circuit and a digital signal processor (DSP) coupled to receive data from and transmit data onto the line;

a controller coupled to the interface circuit, the controller comprising:

an oscillator for providing timing signals selectively at, at least, two different frequencies under the control of a first control signal, the oscillator being coupled to the interface circuit;

a first state machine coupled to the oscillator, having states corresponding to the two different frequencies of the oscillator, the state machine providing the first control signal; and, a second state machine for coordinating reactivation of the interface circuit to the two different frequencies.

7. The apparatus defined by claim 6 including a selectable input to the control circuit for selecting between a slave mode and a master mode.

8. The apparatus defined by claim 7 wherein the selectable input includes an input to select the one of the frequencies which is lower.

* * * * *